(12) United States Patent
Oh

(10) Patent No.: US 11,275,254 B2
(45) Date of Patent: Mar. 15, 2022

(54) OPTICAL IMAGE STABILIZATION (OIS) UNIT OF A CAMERA MODULE

(71) Applicant: LG INNOTEK CO., LTD., Seoul (KR)

(72) Inventor: Sangyun Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/919,881

(22) Filed: Jul. 2, 2020

(65) Prior Publication Data

US 2020/0333623 A1 Oct. 22, 2020

Related U.S. Application Data

(63) Continuation of application No. 16/357,801, filed on Mar. 19, 2019, now Pat. No. 10,725,314, which is a
(Continued)

(30) Foreign Application Priority Data

Oct. 31, 2011 (KR) .......................... 10-2011-0112190
Nov. 8, 2011 (KR) .......................... 10-2011-0115804

(51) Int. Cl.
*G02B 27/64* (2006.01)
*G03B 5/00* (2021.01)
(Continued)

(52) U.S. Cl.
CPC ............. *G02B 27/646* (2013.01); *G02B 7/09* (2013.01); *G03B 5/00* (2013.01); *G03B 13/36* (2013.01);
(Continued)

(58) Field of Classification Search
CPC .......... G02B 27/646; G02B 7/09; G02B 7/02; H04N 5/2254; H04N 5/2252;
(Continued)

(56) References Cited

U.S. PATENT DOCUMENTS 7,881,598 B1 2/2011 Wu et al.
9,332,187 B2 5/2016 Oh
(Continued)

FOREIGN PATENT DOCUMENTS

CN 101257236 A 9/2008
CN 100590505 C 2/2010
(Continued)

*Primary Examiner* — Gevell V Selby
(74) *Attorney, Agent, or Firm* — Birch, Stewart, Kolasch & Birch, LLP

(57) ABSTRACT

An Optical Image Stabilization unit includes a wire connecting a housing to a holder module, a bobbin disposed inside the outer blade, a spring member disposed at the outer blade to support a movement of the bobbin in a direction along an optical axis, a first coil disposed at a periphery of the bobbin, a magnet moving the bobbin relative to the holder module by interacting with the first coil, a second coil moving the holder module relative to the housing by interacting with the magnet, a first solder portion disposed at a distal end of the wire to couple the wire to the housing, a second solder portion disposed at the other distal end of the wire to couple the wire to the holder module, and a buffer portion disposed at a part of the wire by being distanced from at least one of the first solder portion and the second solder portion to restrict a movement of the holder module relative to the housing by being coupled to at least one of the housing and the holder module.

22 Claims, 5 Drawing Sheets

Related U.S. Application Data continuation of application No. 15/094,592, filed on Apr. 8, 2016, now Pat. No. 10,274,746, which is a continuation of application No. 14/583,422, filed on Dec. 26, 2014, now Pat. No. 9,332,187, which is a continuation of application No. 14/203,263, filed on Mar. 10, 2014, now Pat. No. 8,953,096, which is a continuation of application No. 13/550,057, filed on Jul. 16, 2012, now Pat. No. 8,698,952.

(51) Int. Cl.
  *H04N 5/225* (2006.01)
  *H04N 5/232* (2006.01)
  *G02B 7/09* (2021.01)
  *G03B 13/36* (2021.01)

(52) U.S. Cl.
  CPC ......... *H04N 5/2252* (2013.01); *H04N 5/2254* (2013.01); *H04N 5/2257* (2013.01); *H04N 5/2328* (2013.01); *G03B 2205/0007* (2013.01); *G03B 2205/0069* (2013.01); *H04N 5/23212* (2013.01)

(58) Field of Classification Search
  CPC ............... H04N 5/2257; H04N 5/2328; H04N 5/23212; H04N 5/2253; G03B 13/36; G03B 5/00; G03B 2205/0007; G03B 2205/0069; G03B 17/12
  See application file for complete search history.

(56) References Cited

U.S. PATENT DOCUMENTS

| | | | |
|---|---|---|---|
| 2009/0002825 A1 | 1/2009 | Morita et al. | |
| 2009/0052037 A1 | 2/2009 | Wemersson | |
| 2009/0252488 A1 | 10/2009 | Eromaki et al. | |
| 2010/0149354 A1 | 6/2010 | Makimoto et al. | |
| 2010/0150545 A1 | 6/2010 | Imai et al. | |
| 2010/0265343 A1 | 10/2010 | Lee et al. | |
| 2011/0030368 A1 | 2/2011 | Kume | |
| 2011/0096178 A1 | 4/2011 | Ryu et al. | |
| 2011/0217029 A1 | 9/2011 | Wu et al. | |
| 2011/0234827 A1 | 9/2011 | Inoue et al. | |
| 2012/0082442 A1 | 4/2012 | Kwon et al. | |
| 2012/0106936 A1* | 5/2012 | Lim | H04N 5/2257 396/55 |
| 2012/0154614 A1 | 6/2012 | Moriya et al. | |
| 2012/0198484 A1 | 8/2012 | Nishidate | |
| 2012/0224075 A1 | 9/2012 | Lim et al. | |
| 2013/0016427 A1 | 1/2013 | Sugawara | |
| 2013/0016428 A1 | 1/2013 | Sugawara et al. | |
| 2013/0050828 A1 | 2/2013 | Sato et al. | |
| 2014/0362284 A1 | 12/2014 | Shin et al. | |

FOREIGN PATENT DOCUMENTS

| | | |
|---|---|---|
| CN | 101990755 A | 3/2011 |
| JP | 2000-241746 A | 9/2000 |
| JP | 2002-367204 A | 12/2002 |
| JP | 2004-318922 A | 11/2004 |
| JP | 2005-327365 A | 11/2005 |
| JP | 2007-213722 A | 8/2007 |
| JP | 2008-76628 A | 4/2008 |
| JP | 2008-90023 A | 4/2008 |
| JP | 2008-96494 A | 4/2008 |
| JP | 2009-128736 A | 6/2009 |
| JP | 2009-293532 A | 12/2009 |
| JP | 2011-3234 A | 1/2011 |
| JP | 2011-65140 A | 3/2011 |
| JP | 2011-113009 A | 6/2011 |
| JP | 2011-118032 A | 6/2011 |
| JP | 2011-133702 A | 7/2011 |
| JP | 2011-138027 A | 7/2011 |
| JP | 2011-521285 A | 7/2011 |
| JP | 2013-24938 A | 2/2013 |
| JP | 2013-24944 A | 2/2013 |
| JP | 2013-44924 A | 3/2013 |
| JP | 2013-210550 A | 10/2013 |
| JP | 5348235 B2 | 11/2013 |
| KR | 10-2005-0120570 A | 12/2005 |
| KR | 10-0730726 B1 | 6/2007 |
| KR | 10-0952620 B1 | 4/2010 |
| KR | 10-2010-0093263 A | 8/2010 |
| KR | 10-0980044 B1 | 9/2010 |
| TW | 201129822 A1 | 9/2011 |
| WO | WO 2011/021559 A1 | 2/2011 |

* cited by examiner

OPTICAL IMAGE STABILIZATION (OIS) UNIT OF A CAMERA MODULE

CROSS-REFERENCE TO RELATED APPLICATION

This application is a Continuation of co-pending application U.S. application Ser. No. 16/357,801 filed Mar. 19, 2019, which is a Continuation of U.S. application Ser. No. 15/094,592 filed Apr. 8, 2016 (now U.S. Pat. No. 10,274,746B issued Apr. 30, 2019), which is a Continuation of U.S. application Ser. No. 14/583,422 filed on Dec. 26, 2014 (now U.S. Pat. No. 9,332,187 issued on May 3, 2016), which is a Continuation of U.S. application Ser. No. 14/203,263 filed on Mar. 10, 2014 (now U.S. Pat. No. 8,953,096 issued on Feb. 10, 2015), which is a Continuation of U.S. application Ser. No. 13/550,057 filed on Jul. 16, 2012 (now U.S. Pat. No. 8,698,952 issued on Apr. 15, 2014), which claims priority to Korean Patent Application No. 10-2011-0112190 filed on Oct. 31, 2011 and Korean Patent Application No. 10-2011-0115804 filed on Nov. 8, 2011, the entire disclosures of which are expressly incorporated by reference herein in their entireties.

BACKGROUND OF THE INVENTION

Field of the Invention

The present invention relates to a camera module.

Background of the Related Art

A camera module mounted on a small-sized electronic product may be frequently subject to a shock while in use. The camera module may be minutely shaken by a user's hand shaking during photographing. In view of the above problems, there is recently being disclosed a camera module having hand-shaking prevention means.

For example, Korean Registration Patent No. 10-0741823 (registered on Jul. 16, 2007) discloses a method of installing a gyro sensor IC or an angular velocity sensor within a device on which a camera module is mounted, such as a mobile phone in order to correct a hand shaking phenomenon.

If an additional angular velocity sensor is provided as described above, an additional sensor must be provided in order to implement the hand-shaking prevention function. Accordingly, there are problems in that manufacture costs are increased and an additional space where a hand-shaking prevention device will be constructed and installed must be provided in addition to the camera module.

SUMMARY OF THE INVENTION

It is an object of the present invention to provide a camera module having an optical image stabilizer function.

A camera module according to the present invention includes a first Printed Circuit Board (PCB) configured to have an image sensor mounted thereon; a housing unit disposed over the first PCB; a holder module spaced apart from a bottom surface within the housing unit at a specific interval and configured to have first coils wound on its outer circumferential face and to include at least lens therein; a second PCB combined with the bottom surface of the holder module; a third PCB disposed over the holder module; a plurality of wire springs each configured to have one end connected to the second PCB and the other end connected to the third PCB; and buffer units provided at the connection units of the wire springs and the third PCB and configured to surround the connection units of the wire springs and the third PCB.

It is preferred that each of the buffer units include at least one injection hole formed to penetrate the third PCB around a through hole to which the wire spring is connected and a second wire spring through hole formed to penetrate the housing unit in a form taped downwardly so that the second wire spring through hole is placed on the same axis as a through hole formed in the third PCB and formed to communicate with the injection hole through an upper opening.

A camera module according to an exemplary embodiment of the present invention preferably may include an adhesive substance injected into the second wire spring through hole through the injection hole.

Furthermore, the wire springs and the third PCB are coupled through the through hole. Here, it is preferred that the wire springs be connected to the top and bottom surfaces of the third PCB through the through hole by a connection substance and the connection substance include a conductive substance, such as lead.

Furthermore, it is preferred that each of the buffer units include a pair of injection holes formed to penetrate the third PCB on both sides of a first wire spring through hole to which the wire spring is soldered and a second wire spring through hole formed to penetrate the housing unit in a form taped downwardly so that the second wire spring through hole is placed on an axis identical with the first wire spring through hole of the third PCB and to communicate with the pair of injection holes through an upper opening.

Furthermore, a camera module according to an exemplary embodiment of the present invention further includes an adhesive substance injected into the second wire spring through hole through the pair of injection holes. It is preferred that the adhesive substance cover all the connection units formed within the second wire spring through hole and on the top of the third PCB. Here, the adhesive substance preferably may be epoxy.

It is preferred that the second wire spring through hole include the upper opening provided in the housing unit in a funnel form taped downwardly and a wire spring support hole provided axially with the through hole.

The second wire spring through hole may have a diameter equal to or greater than the through hole.

It is preferred that the housing unit include a first housing disposed on the upper side of the first PCB; a second housing disposed on the upper side of the first housing and configured to have the third PCB disposed thereon; first and second permanent magnets interposed between the first and the second housings; and yoke each disposed between the first and the second permanent magnets or placed on the inside of the first and the second housing and configured to transfer magnetic force to the holder module.

It is preferred that the yoke have a central part protruded toward the holder module.

The second housing and the third PCB preferably may be fixed by a double-sided tape.

Furthermore, a camera module according to an exemplary embodiment of the present invention preferably may include a shield can formed to have a through hole at a position where the connection unit of the third PCB and the wire spring corresponds to a lens module and to surround the housing unit.

The holder module includes an outer blade formed to have first coils wound on its outer faces; a bobbin elastically supported by an elastic member on the upper side of the outer blade, disposed to be movable up and down within the outer blade, and configured to have a second coil wound on its outer circumferential face and to have at least one lens installed therein; and upper and lower elastic members disposed on respective upper and lower sides of the bobbin and configured to elastically support the bobbin against the outer blade. A space unit may be formed at the center of each of the first coils so that magnetic force is applied toward the second coil.

The wire springs preferably may be made of metal material and conductive with the second and the third PCBs.

The number of the wire springs preferably may be at least 6 so that a power source of two polarities for auto-focusing control and a power source of four polarities for optical image stabilizer are supplied to the holder module through connection between the wire springs and the second and the third PCBs.

Furthermore, four pairs of the wire springs having the same length may be disposed at the respective corners of the holder module.

A camera module according to another exemplary embodiment of the present invention includes a first Printed Circuit Board (PCB) configured to have an image sensor mounted thereon; a housing unit disposed over the first PCB; a holder module spaced apart from a bottom surface within the housing unit at a specific interval and configured to have first coils wound on its outer circumferential face and to include at least lens therein; a second PCB combined with the bottom surface of the holder module; a third PCB disposed over the holder module; and a plurality of wire springs each configured to have one end connected to the second PCB and the other end connected to the third PCB, wherein the wire springs and the third PCB are connected through through holes formed to penetrate the third PCB so that the top and bottom surfaces of the third PCB are connected by a connection substance.

Meanwhile, a camera module according to the present invention may further include surface processing units formed at both ends of each of the wire springs and configured to increase bonding force between the wire springs and the second and the third PCBs.

The surface processing unit may be coarsely formed by polishing a surface of the wire spring or may be formed by removing the coating film of the wire spring.

In accordance with the present invention, the wire springs can be firmly connected to the connection units of the PCBs because the buffer units for absorbing load repeatedly applied to the wire springs are provided.

Furthermore, although excessive force is applied to the wire springs in a process of assembling the lens module, the buffer units can absorb the excessive force. Accordingly, an assembly property can be improved, and the loss of parts due to poor assembly can be minimized.

BRIEF DESCRIPTION OF THE DRAWINGS

Further objects and advantages of the invention can be more fully understood from the following detailed description taken in conjunction with the accompanying drawings in which.

DETAILED DESCRIPTION OF EMBODIMENTS

Hereinafter, some exemplary embodiments of the present invention are described in detail with reference to the accompanying drawings.

Figure 1:
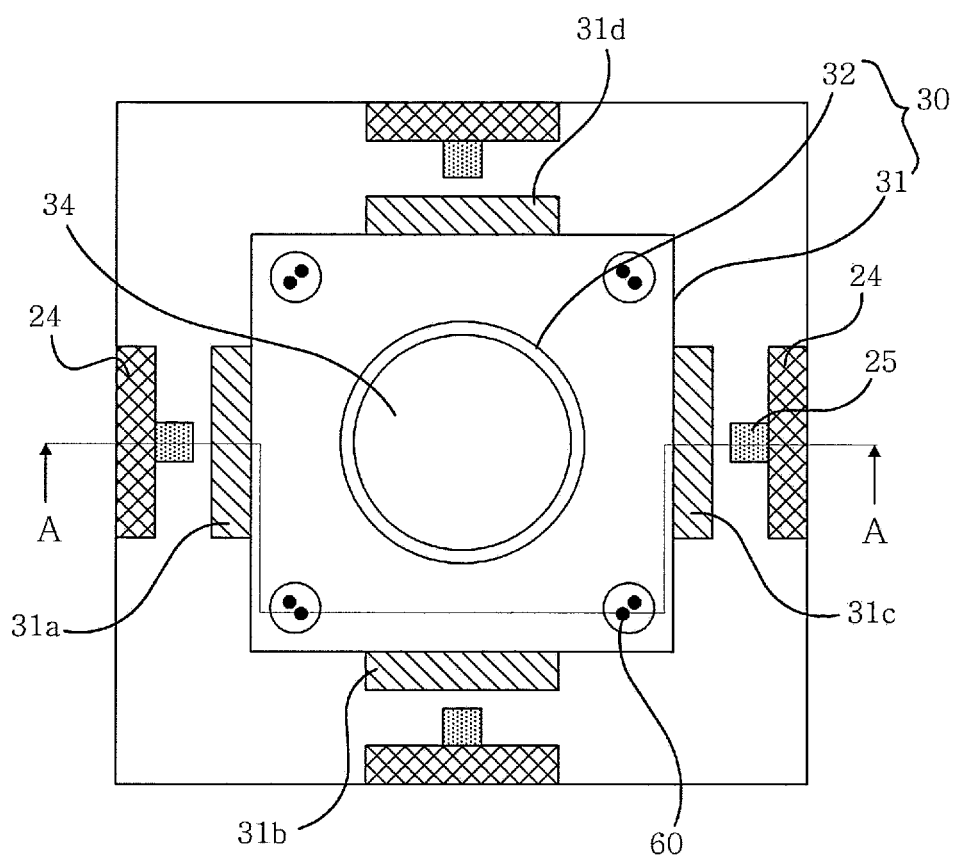
FIG. 1 is a schematic plan view of a camera module according to an embodiment of the present invention.
Figure 2:
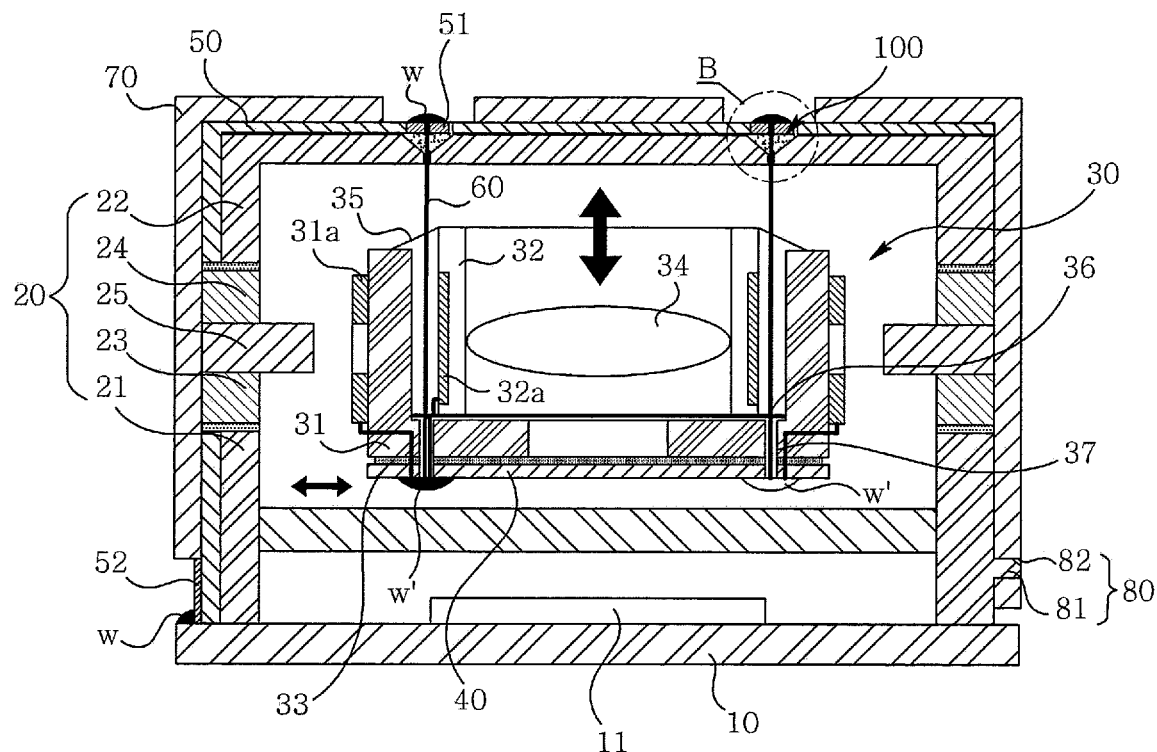
FIG. 2 is a sectional view of the camera module taken along line A-A of FIG. 1.
Figure 3:
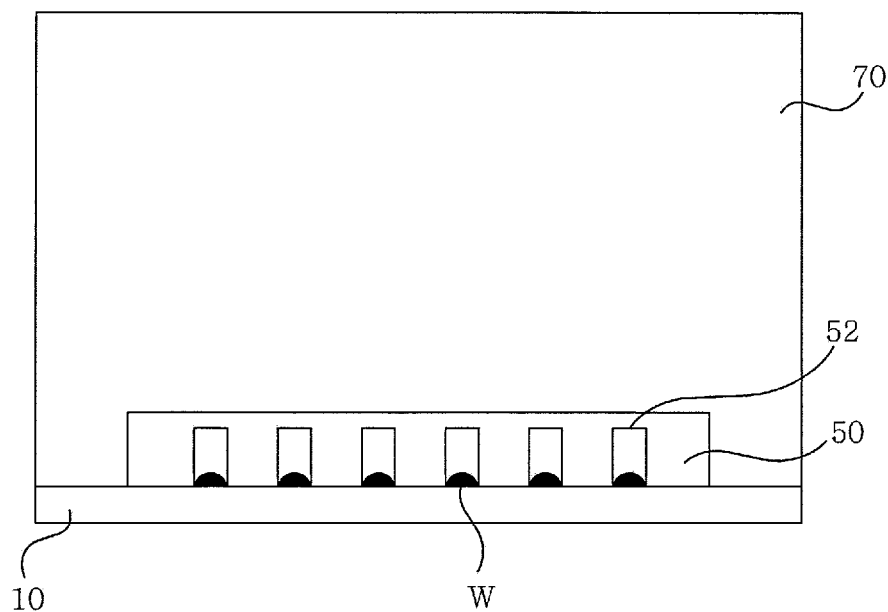
FIGS. 3 and 4 are side views of the camera module according to the embodiment of the present invention.
Figure 4:
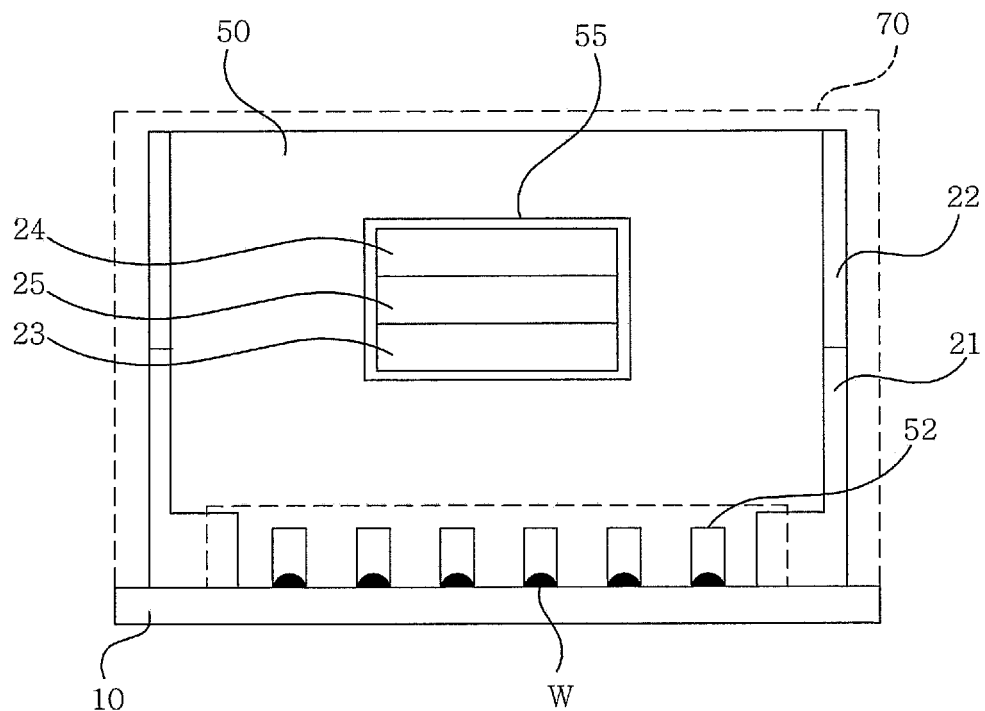
Figure 5:
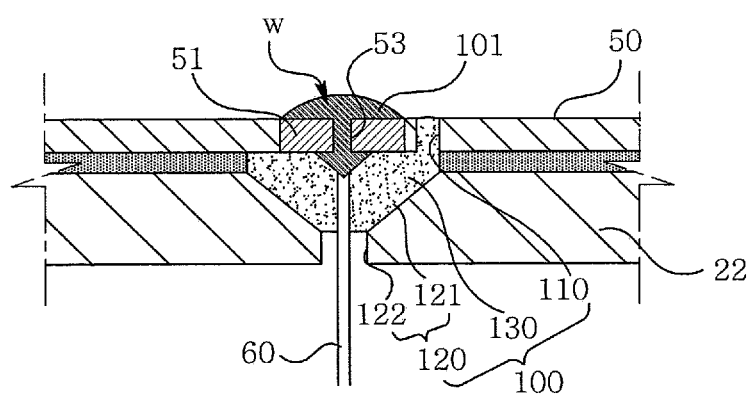
FIG. 5 is an enlarged view of a part B of FIG. 2 according to a first embodiment of the present invention.

FIG. 1 is a schematic plan view of a camera module according to an embodiment of the present invention, FIG. 2 is a sectional view of the camera module taken along line A-A of FIG. 1, FIGS. 3 and 4 are side views of the camera module according to the embodiment of the present invention, and FIG. 5 is an enlarged view of a part B of FIG. 2 according to a first embodiment of the present invention.

As shown in FIG. 1 showing the schematic plan view and FIG. 2 showing the schematic side view of line A-A in FIG. 1, the camera module according to the present invention includes a first Printed Circuit Board (hereinafter referred to as a PCB) 10, a housing unit 20, a holder module 30, a second PCB 40, a third PCB 50, wire springs 60, and buffer units 100.

It is preferred that an image sensor 11 be mounted approximately on the central part of the first PCB 10. Elements for driving the image sensor 11 may be disposed in the first PCB 10 or a plurality of terminal units for supplying power and outputting information from the image sensor 11 may be provided in the first PCB 10.

The housing unit 20 is disposed over the first PCB 10, and it forms the framework of the camera module. In accordance with an exemplary embodiment of the present invention, the housing unit 20 includes a first housing 21, a second housing 22, pairs of first and second permanent magnets 23 and 24, and a plurality of yokes 25.

The first housing 21 is a base and is disposed on the top of the first PCB 10 and spaced apart from the image sensor 11 at a specific interval. A filter member for filtering an image phase incident on the image sensor 11 may be further included in the first housing 21 as occasion demands.

The second housing 22 is disposed on the top of the first housing 21 and is configured to cover the first housing 21. An opening is formed approximately at the center of the second housing 22 so that an image can be transferred to the image sensor 11. The third PCB 50 is adhered and fixed to the upper lateral face of the second housing 22 using a fixing member to be described later, such as a double-sided tape or an adhesive, but not limited thereto. In some embodiments, however, an additional third housing, such as a casing or a shield can, may be provided, and the third PCB 50 may be fixed to the inside of the additional third housing using the fixing member according to a product design. If the third housing is provided, the third housing may press and support the third PCB 50 without an additional fixing member.

The first and the second permanent magnets 23 and 24 are interposed between the first and the second housings 21 and 22 and are configured to apply magnetic force to the holder module 30. It is preferred that the first and the second permanent magnets 23 and 24 have the same size. Furthermore, the first and the second permanent magnets 23 and 24 and the yoke 25 may be disposed on the inside of the first and the second housing 21 and 22, if possible, within a design tolerance limit.

Meanwhile, if the size of the first and the second permanent magnets 23 and 24 is increased, OIS driving is increased even by low current. If the first and the second permanent magnets 23 and 24 are configured to have a specific size, OIS driving is increased as current flowing into first and the second coils 31a to 31d and 32a disposed at positions corresponding to the first and the second permanent magnets 23 and 24 is increased. Consequently, OIS driving becomes better according to an increase of the first and the second permanent magnets 23 and 24, but it is preferred that the first and the second permanent magnets 23 and 24 have an optimized size within a design tolerance limit.

Each of the yokes 25 is interposed between each of the pairs of first and the second permanent magnets 23 and 24. Furthermore, the central portion of the yoke 25 is configured to have a protruded shape so that the pair of first and second permanent magnets 23 and 24 may apply magnetic force to the internal space of the holder module 30. It is preferred that the yoke 25 be configured to the same width as the pair of first and second permanent magnets 23 and 24, the center of the yoke 25 be protruded in a specific size, and the pair of first and second permanent magnets 23 and 24 and the yoke 25 have an approximately 'T' shape.

The holder module 30 is spaced apart from the bottom surface of the inside of the housing unit 20 and is formed of an outer blade 31 and a bobbin 32. The holder module 30 may perform a pendulum movement in the front/rear, left/right, and diagonal directions with it dangled from the wire springs 60.

Spring members 35 and 36 are provided in the upper and lower parts of the outer blade 31, respectively. The outer blade 31 is elastically supported by the spring member 35 so that the bobbin 32 is moved up and down.

As shown in FIG. 1, a total of four first coils 31a to 31d are wound on the four outer faces of the outer blade 31, respectively, and the central part of each of the four outer faces of the outer blade 31 on which the first coils 31a to 31d are wound is perforated without a coil. Each of the yokes 25 is disposed at a position corresponding to the perforated space unit, and thus the yoke 25 may be partially inserted into the space unit.

The second PCB 40 may be fixed to the bottom of the outer blade 31 using a fixing member 33, such as a double-sided tape or an adhesive. The outer blade 31 is dangled from the plurality of wire springs 60 so that the outer blade 31 can move in the front/rear and left/right directions or in a diagonal line according to an interaction between the magnetic force of the first and the second permanent magnets 22 and 23 and the first coils 31a, as indicated by an arrow of FIG. 2. Furthermore, the outer blade 31 is spaced apart from the bottom surface of the first housing 21 at a specific interval.

Furthermore, a plurality of spring through holes 37 may be provided in the outer blade 31 so that the wire springs 60 are connected to the second PCB 40 through the spring through holes 37.

The bobbin 32 is disposed within the outer blade 31 so that it is movable up and down. At least one lens 34 is installed within the bobbin 32. The second coil 32a is wound on the outer circumferential face of the bobbin 32. The second coil 32a performs an operation of raising up and lowering the bobbin 32 through an interaction with the magnetic force applied through the perforated spaces without the first coils 31a to 31d of the outer blade 31 through the yokes 25. As the size of the yoke 25 increases, AF driving may become better, but may be changed according to an optimal design value. It is possible to automatically control the focus of an image transferred to the image sensor 11 through the raising action of the bobbin 32.

The second PCB 40 is disposed at the bottom surface of the outer blade 31 as described above and is connected to the wire springs 60 so that it can supply a power source to the first and the second coils 31a to 31d and 32a. This connection method may include any method if soldering or other conductive substances may be used. That is, the connection units w' of the second PCB 40 are connected to the first coils 31a to 31d, respectively, and the second coil 32a, as shown in, FIG. 2. Thus, a power source supplied through the wire springs 60 is transferred to the first and the second coils 31a to 31d and 32a, thus forming electromagnetic force.

Here, the second coil 32a may be directly connected to the second PCB 40, or the second coil 32a may be connected to the lower spring 36 and the lower spring 36 may be then connected to the second PCB 40 as shown in FIG. 2.

The third PCB 50 is fixed to the top of the second housing 22 using the fixing member, such as a double-sided tape or an adhesive member, as described above. A power source transferred through the terminal unit 52 of the third PCB 50 connected to the first PCB 10 is transferred to the second PCB 40 through the wire springs 60 connected to the second PCB 40. This connection method may include any method if soldering or other conductive substances may be used.

The third PCB 50 may be provided to cover the walls of the first and the second housings 21 and 22 on one side, as shown in FIGS. 3 and 4. Here, a window 55 may be formed in a surface of the third PCB 50 where the third PCB 50 faces the first and the second permanent magnets 23 and 24 and the yoke 25 in order to avoid interference therebetween.

The window 55 functions to prevent the third PCB 50 from being influenced by coupling portions because the first and the second permanent magnets 23 and 24 and the yoke 25 are directly adhered to a shield can 70 (described later) by using the fixing means, such as epoxy.

Meanwhile, a flexible PCB (FPCB), a PCB, or a rigid FPCB integration type (R-FPCB) may be used as each of the second PCB 40 and the third PCB 50, but not limited thereto. Any board may be used as the second PCB 40 and the third PCB 50 if the board enables electrical connection.

Each of the wire springs 60 has both ends connected to the second and the third PCBs 40 and 50. Here, one end of the wire spring 60 is connected to a pad 51 formed in the third PCB 50 as shown in FIG. 5. A through hole 53 through which the wire spring 60 passes is formed at the center of the pad 51. In this case, a connection method may include any method if soldering or other conductive substances may be used. Meanwhile, a Solder Register (SR) is provided around the pad 51, thus protecting a surface of the third PCB 50. The area of the pad 51 may be connected by opening the SR so that the area is conductive.

The wire spring 60 connected at the pad 51 as described above supplies the power source from the terminal unit 52 to the second PCB 40, so that the first and the second coils 31a to 31d and 32a may interact with the first and the second permanent magnets 23 and 24.

Furthermore, the other end of the wire spring 60 is connected to the second PCB 40, provided at the bottom surface of the outer blade 31, through the spring through hole 37 formed in the outer blade 31, as shown in FIG. 2. As in the third PCB 50, the other end of the wire spring 60 is connected at a pad (not shown) formed in the second PCB 40, although not shown. A through hole (not shown) through which the wire spring 60 passes is formed at the center of the pad (not shown). In this case, a connection method may include any method if soldering or other conductive substances may be used. In this construction, the outer blade 31 may be dangled from the wire springs 60 and may be spaced apart from the bottom surface of the first housing 21. In this case, the outer blade 31 performs a pendulum movement according to an interaction between the first coils 31a to 31d and the first and the second permanent magnets 23 and 24. Accordingly, the vibration of the outer blade 31 due to hand shaking can be corrected by the interaction between the first coils 31a to 31d and the first and the second permanent magnets 23 and 24. To this end, it is preferred that the wire spring 60 be made of metal material that has elasticity enough to withstand a shock and conductivity.

Meanwhile, as the thickness of the wire spring 60 is reduced, optical image stabilizer motility becomes better even at a low current, but may be changed according to an optimal design value. It is preferred that the thickness of the wire spring 60 be several μm to several hundreds of μm, more preferably, 1 to 100 μm.

Furthermore, it is preferred that the number of wire springs 60 be at least six. It is necessary to supply a power source of two polarities for auto-focusing control and a power source of four polarities for optical image stabilizer to the holder module 30 through connection between the wire springs 60 and the second and the third PCBs 40 and 50.

In accordance with an exemplary embodiment of the present invention, it is preferred that four pairs of the wire springs 60 having the same length are disposed at the respective corners of the holder module 30 in order to keep the balance, as shown in FIGS. 1 and 2.

Meanwhile, if an additional third housing, such as the shield can 70, is included as shown in FIG. 2, the windows 55 for covering the walls of the first and the second housings 21 and 22 are formed in the third PCB 50 in order to avoid the coupling parts because the first and the second permanent magnets 23 and 24 and the yokes 25 are fixed to the shield can 70 using epoxy, as described above.

If the shield can 70 is omitted, the first and the second permanent magnets 23 and 24 and the yokes 25 may be attached and fixed within the third PCB 50. In some embodiments, the windows 55 may be formed in the third PCB 50 as described above, and the first and the second permanent magnets 23 and 24 and the yokes 25 may be inserted into the windows 55. Reinforcement may be additionally performed outside the third PCB 50 using a shielding tape.

Buffer units 100 function to absorb a shock and repeated load applied to the wire springs 60 by surrounding connection units w where the wire springs 60 are connected to the third PCB 50.

In accordance with an exemplary embodiment of the present invention, each of the buffer units 100 includes an injection hole 110 and a second wire spring through hole 120.

The injection hole 110 is formed around the through hole 53 to which the wire spring 60 passing through the third PCB 50 is soldered. In accordance with the first embodiment of the present invention, the number of injection holes 110 may be one, as shown in FIG. 5.

The second wire spring through hole 120 is provided in the second holder 22. The second wire spring through hole 120 includes an upper opening 121 and a support hole 122.

Figure 6:
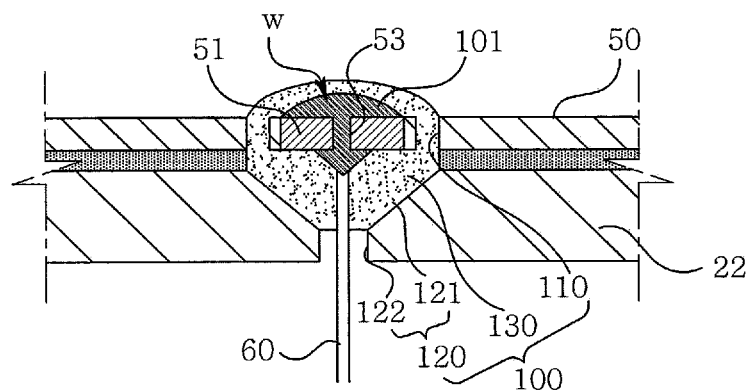
FIG. 6 is an enlarged view of a part B of FIG. 2 according to a second embodiment of the present invention.

The upper opening 121 has a structure that is taped downwardly. It is preferred that the upper opening 121 have a conical funnel shape that is downwardly tapered, as shown in FIGS. 5 and 6. The support hole 122 is formed in the same axis as the through hole 53. It is preferred that the support hole 122 have a diameter equal to or greater than the through hole 53.

It is preferred that the through hole 53 have a diameter slightly greater than the wire spring 60. When the wire spring 60 is connected at the pad 51 formed in the third PCB 50, a connection substance 101, such as soldering or another conductive substance, flows out through the through hole 53. The connection substance 101 may be connected to the wire spring 60 in the top and bottom surfaces of the third PCB 50, as shown in FIGS. 5 and 6.

It is preferred that the diameter of the support hole 122 be slightly greater than the diameter of the wire spring 60. The diameter of the support hole 122 may be equal to or greater than the diameter of the through hole 53. That is, the diameter of the support hole 122 may be designed so that the wire spring 60 does not interfere with the second holder 22 near the support hole 122 through contact with the second holder 22.

A shown in FIG. 5, an adhesive substance 130 is injected through the injection hole 110 and then filled in the internal space unit of the second wire spring through hole 120. The adhesive substance 130 may further cover the connection unit w of the third PCB 50. The adhesive substance 130 filled in the second wire spring through hole 120 may absorb a shock and load transferred to the connection unit w of the wire spring 60 and the third PCB 50 and may prevent the wire spring 60 from being shaken within the upper opening 121 of the second wire spring through hole 120. Epoxy may be used as the adhesive substance 130, but not limited thereto. Any material that may support elasticity through adhesion may be used as the adhesive substance 130.

In accordance with a second embodiment of the present invention, the buffer unit 100 may be configured like in the first embodiment, but a pair of the injection holes 110 may be provided in the buffer unit 100. In this case, the pair of the injection holes 110 may be disposed on both sides of the through hole 53 or may be symmetrically disposed each other, but not limited to the positions.

In this case, the adhesive substance 130 injected through the pair of injection holes 110 may fully cover not only the inside of the upper opening 121 of the second wire spring through hole 120, but also the connection unit w formed on the top of the third PCB 50, as shown in FIG. 4.

In accordance with this construction, there are additional effects that the connection unit w of the third PCB 50 exposed at the top can be prevented from being damaged by an external shock and the connection unit w is insulated.

Meanwhile, in a common assembly process, after the bobbin 32 and the outer blade 31 are combined, the second housing 22, the second and the third PCBs 40 and 50, and the wire springs 60 are coupled, the bobbin 32 including a lens barrel is combined, the first housing 21 is connected, and the first housing 21 is then mounted on the first PCB 10 by using a jig. Alternatively, the permanent magnets and the yokes may be combined before the first housing 21 is connected. The sequence of the above assembly may be changed as occasion demands. In other words, the assembly may be directly performed in equipment without a jig. In this process, although force for inserting and combining the bobbin 32 including the lens barrel is excessively great and the connection units w are adversely affected by the excessive force, the buffer units 100 may absorb the excessive force.

In other words, the transformation energy of the buffer unit 100 absorbs load that is generated in the wire spring 60 around the connection unit w of the wire spring 60 and the third PCB 50 and thus pulled in the direction of gravity and load generated when the wire spring 60 is shaken left and right, as shown in FIGS. 2, 5, and 6.

Accordingly, a problem that the connection task has to be performed again or that a damaged product cannot be used because the connection unit w is broken during the assembly process can be avoided. It is thus possible to produce a reliable camera module.

Surface processing units 1100 are formed at both ends of each of the wire springs 60, thereby improving a coupling property between the second and the third PCBs 40 and 50 and the wire spring 60.

In accordance with third and fourth embodiments of the present invention, each of the surface processing units 1100 may be coarsely formed by polishing a surface of the wire spring 60 as shown in FIG. 5 or may be formed by partially removing a coating film formed on the surface of the wire spring 60 using a method, such as corrosion, as shown in FIG. 6. If the surface processing unit 1100 is formed as described above, bonding force between lead and the wire spring 60 can be improved when a soldering process using lead as the connection substance is performed.

Figure 7:
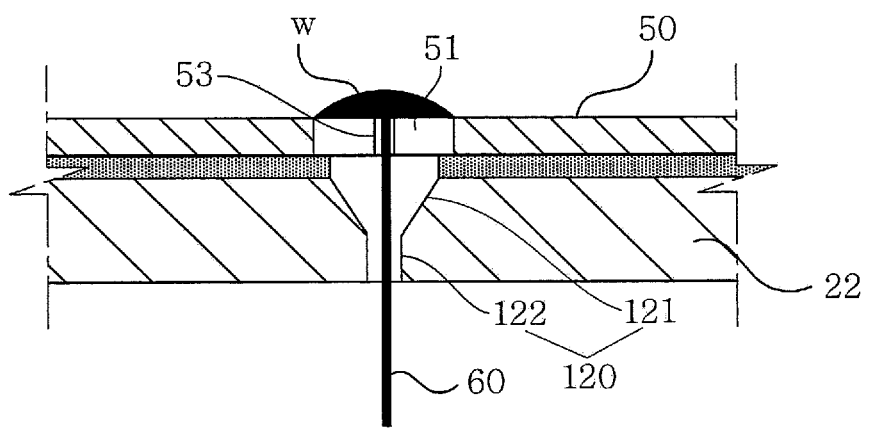
FIG. 7 is an enlarged view of a part B of FIG. 2 according to third and fourth embodiments of the present invention.

Meanwhile, a second wire through hole 120 is provided in the second holder 22, as shown in FIG. 7. The second wire through hole 120 includes an upper opening 121 and a wire spring support hole 122.

The upper opening 121 has a conical funnel shape that is downwardly tapered. The wire spring support hole 122 is formed on the same axis as the first wire through hole 53. It is preferred that the wire spring support hole 122 have a diameter equal to or greater than the first wire through hole 53.

Here, the diameter of the first wire through hole 53 may be slightly greater than the diameter of the wire spring 60. The diameter of the first wire through hole 53 may be designed so that, when the wire spring 60 is connected to the pad 51 formed in the third PCB 50, a connection substance, such as soldering or other conductive substances, flows down through the first wire through hole 53 and the connection substance is then connected and fixed to the wire spring 60 on the top and bottom surfaces of the third PCB 50.

Furthermore, the diameter of the wire spring support hole 122 may be slightly greater than the diameter of the wire spring 60. The wire spring support hole 122 may have a diameter equal to or greater than the first wire through hole 53. That is, the diameter of the wire spring support hole 122 may be designed so that the wire spring 60 does not interfere with the second holder 22 near the support hole 122 through contact with the second holder 22.

In accordance with this construction, the wire springs 60 can be combined with the second and the third PCBs 40 and 50 more firmly. Furthermore, a reliability problem (e.g., the separation or disconnection of the wire springs 60 that may occur owing to external force, such as a drop) can be improved.

Figure 8:
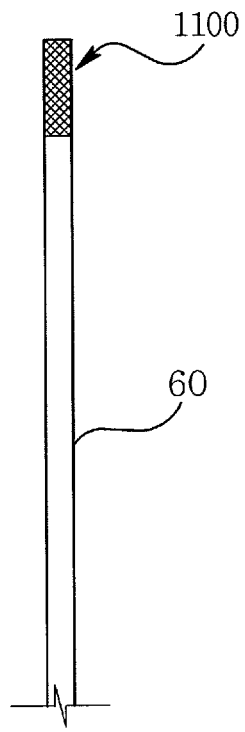
FIG. 8 is a diagram showing shows the surface processing units of a wire spring according to the third embodiment of the present invention.
Figure 9:
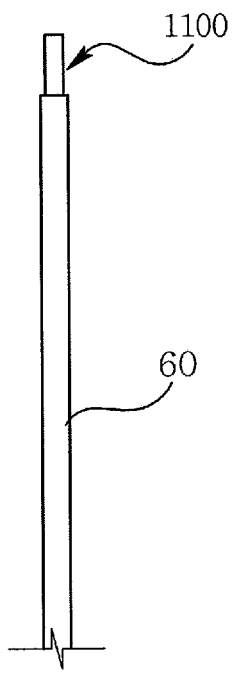
FIG. 9 is a diagram showing shows the surface processing units of a wire spring according to a fourth embodiment of the present invention.

That is, the surface processing units 1100 increase the frictional force of the connection units w and w' between the wire springs 60 and the second and the third PCBs 40 and 50, so that the surface processing units 1100 withstand load in the direction of gravity applied to the wire springs 60 at the connection units w and w' and load that may occur when the wire springs 60 are shaken left and right, as shown in FIGS. 2, 8, and 9.

Accordingly, a problem that the connection task has to be performed again or that a damaged product cannot be used because the connection unit w is broken during the assembly process can be avoided. It is thus possible to produce a more reliable camera module.

Meanwhile, the surface processing unit 1100 may be formed only at the end of one side of the wire spring 60, although not shown. That is, the surface processing unit 1100 may be formed only at the connection unit w with the third PCB 50 to which heavy load is repeatedly applied or at the connection unit w' with the second PCB 40.

Meanwhile, the shield can 70 may be further provided to have a through hole at a position corresponding to the lens module 30 near the connection units w of the third PCB 50 and the wire springs 60 and configured to surround the housing units 21 and 22. In this case, the third PCB 50 may be attached and fixed to the inside of the shield can 70 as described above. Meanwhile, the shield can 70 is not a requisite and may be omitted according to constructions of the housing units 21 and 22.

Meanwhile, as shown in FIG. 2, in order to fix the shield can 70 to the first housing 21, a hook unit 80 may be provided at each of the four faces or at one or more faces. The position of the hook unit 80 may be within a range in which the center or corner design is allowed. The number of hook units 80 may be one or more.

The hook unit 80 may include a hook 81 protruded into the first housing 21 and a hook hole 82 formed to penetrate the shield can 70 facing the hook 81, and an opposite construction is possible as an occasion demands.

The embodiments of the present invention described above and shown in the drawings should not be construed as limiting the technical spirit of the present invention. The scope of the present invention is restricted by only the claims, and a person having ordinary skill in the art to which the present invention pertains may improve and modify the technical spirit of the present invention in various forms. Accordingly, the modifications and modifications will fall within the scope of the present invention as long as they are evident to those skilled in the art.

The invention claimed is:

1. An Optical Image Stabilization (OIS) unit comprising;
   a base;
   a first substrate disposed on the base and comprising a terminal;
   a holder module spaced apart from the base and comprising an outer blade, a bobbin disposed in the outer blade, and a spring member connecting the outer blade and the bobbin;
   a first coil disposed on the bobbin;
   a magnet facing the first coil;
   a second coil facing the magnet;
   a wire coupled with the holder module;
   a first connection unit fixing a first end portion of the wire;
   a second connection unit fixing a second end portion of the wire; and
   a buffer portion disposed on a part of the wire and comprising an adhesive material,
   wherein the holder module comprises first, second, third and fourth corner portions,
   wherein the first coil is electrically connected with the wire,
   wherein the wire is disposed on the first, second, third and fourth corner portions of the holder module, wherein the wire comprises six wires spaced apart from each other, wherein two wires of the six wires are disposed on the first corner portion, and another two wires of the six wires are disposed on the third corner portion, wherein at least a portion of the buffer portion is disposed between the first connection unit and the outer blade, and wherein, in a direction perpendicular to the wire, a maximum width of the buffer portion is greater than a maximum width of the first connection unit.

2. The OIS unit of claim 1, wherein the first substrate comprises a first portion disposed above the base and a second portion bent from the first portion.

3. The OIS unit of claim 1, wherein two wires of the six wires are electrically connected with the first coil.

4. The OIS unit of claim 1, wherein the two wires disposed on the first corner portion are electrically connected with the first coil.

5. The OIS unit of claim 1, wherein the terminal comprises a plurality of terminals, and wherein the six wires are electrically connected to different terminals of the plurality of terminals, respectively.

6. The OIS unit of claim 1, wherein the first corner portion and the third corner portion are disposed opposite to each other based on an optical axis, and wherein at least the portion of the buffer portion is disposed under the first connection unit.

7. The OIS unit of claim 1, wherein the buffer portion is configured to absorb a shock or load applied to the wire, wherein the spring member comprises an upper spring coupled to an upper portion of the bobbin and a lower spring coupled to a lower portion of the bobbin, wherein the first connection unit is disposed nearer to the upper spring than the lower spring, and wherein the second connection unit is disposed nearer to the lower spring than the upper spring.

8. The OIS unit of claim 2, wherein the wire connects the holder module and the first portion of the first substrate.

9. The OIS unit of claim 2, wherein the first substrate comprises a pad disposed on the first portion and a hole disposed in a center area of the pad, and wherein the wire passes through the hole and is coupled to the pad by a solder.

10. The OIS unit of claim 9, wherein a solder resistor is disposed on a periphery of the pad to form an outer surface of the first substrate.

11. The OIS unit of claim 2, wherein the first connection unit is a first solder portion, and the second connection unit is a second solder portion, and wherein a distance between the first solder portion and the second solder portion is greater than a distance between the first portion of the first substrate and the spring member.

12. The OIS unit of claim 2, wherein the first portion of the first substrate comprises a first surface facing the holder module and a second surface disposed opposite to the first surface, and wherein the wire is coupled to the second surface of the first portion of the first substrate.

13. The OIS unit of claim 11, wherein a part of the buffer portion is disposed between the first solder portion and the second solder portion.

14. A camera module, comprising:
a printed circuit board (PCB);
an image sensor disposed on the PCB;
the OIS unit of claim 1 disposed on the PCB; and
a lens coupled to the bobbin of the OIS unit and being spaced apart from the image sensor.

15. A mobile phone, comprising the camera module of claim 14.

16. An Optical Image Stabilization (OIS) unit comprising;
a base;
a substrate disposed on the base and comprising a plurality of terminals;
a holder module spaced apart from the base and comprising an outer blade, a bobbin disposed in the outer blade, and a spring member connecting the outer blade and the bobbin;
a first coil disposed on the bobbin;
a magnet facing the first coil;
a second coil facing the magnet;
a wire coupled with the holder module;
a first connection unit fixing a first end portion of the wire, and a second connection unit fixing a second end portion of the wire; and
an adhesive material disposed on a part of the wire,
wherein the holder module comprises first, second, third and fourth corner portions,
wherein the first coil is electrically connected with the wire,
wherein the wire is disposed on the first, second, third and fourth corner portions of the holder module,
wherein the wire comprises a plurality of wires spaced apart from each other,
wherein two wires of the plurality of wires are disposed on the first corner portion, and another two wires of the plurality of wires are disposed on the third corner portion,
wherein the two wires disposed on the first corner portion are electrically respectively connected with different terminals of the plurality of terminals, and
wherein at least a portion of the adhesive material is disposed between the first connection unit and the outer blade.

17. The OIS unit of claim 16, wherein the wire connects the holder module and the substrate, wherein the substrate comprises a pad and a hole disposed in a center area of the pad, wherein the wire passes through the hole and is coupled to the pad by a solder, wherein the plurality of terminals of the substrate comprises at least six terminals for supplying a current to the first coil and the second coil, wherein the first coil is electrically connected with the spring member, wherein the two wires disposed on the first corner portion are disposed at a same distance with respect to an optical axis, and wherein the first corner portion and the third corner portion are disposed opposite to each other based on the optical axis.

18. The OIS unit of claim 16, wherein the spring member comprises an upper spring coupled to an upper portion of the bobbin and a lower spring coupled to a lower portion of the bobbin, and wherein the adhesive material is disposed nearer to the upper spring than the lower spring.

19. The OIS unit of claim 16, wherein the adhesive material is contacted with any one of the first connection unit and the second connection unit.

20. The OIS unit of claim 16, wherein, in a direction perpendicular to the wire, a maximum width of the adhesive material is greater than a maximum width of the first connection unit.

21. The OIS unit of claim 18, wherein the first connection unit is disposed nearer to the upper spring than the lower spring, and
   wherein the second connection unit is disposed nearer to the lower spring than the upper spring.

22. The OIS unit of claim 16, wherein at least the portion of the buffer portion is disposed under the first connection unit.

* * * * *